United States Patent [19]

Smith et al.

[11] Patent Number: 5,398,991

[45] Date of Patent: Mar. 21, 1995

[54] SEAT ARM DISPLAY MONITOR DEPLOYMENT MECHANISM

[75] Inventors: Alan C. Smith, Irvine, Calif.; James E. Wicks, Hoboken, N.J.

[73] Assignee: Sony Trans Com Incorporated, Irvine, Calif.

[21] Appl. No.: 16,157

[22] Filed: Feb. 9, 1993

[51] Int. Cl.⁶ .............................................. A47C 7/62
[52] U.S. Cl. ............................... 297/88.16; 248/919; 248/921
[58] Field of Search ............... 297/194, 145; 248/919, 248/920, 921, 922, 923

[56] References Cited

U.S. PATENT DOCUMENTS

| | | | |
|---|---|---|---|
| Re. 33,423 | 11/1990 | Lobanoff | 297/191 |
| D. 328,292 | 7/1992 | Akita et al. | D14/126 |
| 2,098,426 | 11/1937 | McDonald | 155/128 |
| 2,652,101 | 9/1953 | Samsky et al. | 155/177 |
| 3,168,346 | 2/1965 | Rei, Jr. | 297/113 |
| 4,311,461 | 1/1982 | Hotta et al. | 433/33 |
| 4,383,626 | 5/1983 | Weinblatt | 224/275 |
| 4,585,196 | 4/1986 | Cormier | 248/214 |
| 4,607,784 | 8/1986 | Calabrese | 229/27 |
| 4,630,821 | 12/1986 | Greenwald | 273/85 G |
| 4,647,980 | 3/1987 | Steventon et al. | 358/254 |
| 4,674,631 | 6/1987 | Williams | 206/216 |
| 4,681,366 | 7/1987 | Lobanoff | 297/191 |
| 4,703,972 | 11/1987 | Omberg | 296/97 R |
| 4,708,312 | 11/1987 | Rohr | 248/280.1 |
| 4,711,488 | 12/1987 | Ohanessian | 297/190 |
| 4,717,202 | 1/1988 | Batchelder et al. | 297/191 |
| 4,756,528 | 7/1988 | Umashankar | 273/1 E |
| 4,883,242 | 11/1989 | Becker et al. | 244/118.5 |
| 4,915,461 | 4/1990 | Kingsborough et al. | 312/247 |
| 4,964,671 | 10/1990 | Millar | 296/178 |
| 4,995,680 | 2/1991 | Miruri | 312/7.1 |
| 5,000,511 | 3/1991 | Shichijo et al. | 297/191 |
| 5,076,524 | 12/1991 | Reh et al. | 248/296 |
| 5,076,645 | 12/1991 | Yokota | 297/417 |
| 5,096,271 | 3/1992 | Portman | 312/7.2 |
| 5,143,422 | 9/1992 | Althofer et al. | 297/411 |
| 5,145,134 | 9/1992 | Hashimoto et al. | 248/183 |

(List continued on next page.)

FOREIGN PATENT DOCUMENTS

| | | | |
|---|---|---|---|
| 452192 | 10/1949 | Italy | 297/194 |
| 54-105499 | 7/1979 | Japan | B64D 11/06 |
| 57-199369 | 12/1982 | Japan | H04N 5/00 |
| 63-15676 | 2/1988 | Japan | H04N 5/64 |
| 63-128844 | 8/1988 | Japan | A47C 7/72 |
| 63-128845 | 8/1988 | Japan | A47C 7/72 |

OTHER PUBLICATIONS

Computer reprint of article entitled "Phillips Airvision to install video monitors on Korean passenger planes", originally published in Consumer Electronics, dated Dec. 14, 1992, author unknown, pertinent pages of original publication unknown, pertinent page of computer reprint copy is p. 1.

(List continued on next page.)

*Primary Examiner*—James R. Brittain
*Assistant Examiner*—David E. Allred
*Attorney, Agent, or Firm*—Limbach & Limbach

[57] ABSTRACT

A display support apparatus for supporting a generally flat, video display from a passenger seat arm rest is disclosed. The video display is of the type having a screen mounted on a front face, and the arm rest is of the type having a recess for stowing the video display and the display support apparatus. An angled support arm having first and second ends is included. The support arm has a length at least as long as a diameter of the front face of the video display. A first pivot block is used for pivotally attaching the video display to the first end of the support arm. The first pivot block has a first freedom of movement to permit the video display to be rotated with respect to the support arm between a viewing position and a position in which a side of the video display and the support arm are aligned and substantially parallel with each other to form a generally rectangular configuration which is stowable in the arm rest recess. A second pivot block is used for pivotally attaching the second end of the support arm to a front portion of the arm rest to allow the support arm and video display to be rotated into and out of the arm rest recess.

12 Claims, 9 Drawing Sheets

U.S. PATENT DOCUMENTS

| | | | |
|---|---|---|---|
| 5,152,479 | 10/1992 | Ash et al. | 244/122 R |
| 5,177,616 | 1/1993 | Riday | 248/919 |
| 5,179,447 | 1/1993 | Lain | 297/194 |
| 5,181,771 | 1/1993 | Robak et al. | 312/7.2 |
| 5,184,224 | 2/1993 | Mitani et al. | 358/231 |
| 5,195,709 | 3/1993 | Yasushi | 297/194 |

OTHER PUBLICATIONS

Computer reprint of article entitled "Matsushita Supplies Airbus With Entertainment System", originally published in Wing Newsletter (Japan's Aerospace & Aviation Weekly), dated May 13, 1992, author unknown, pertinent pages of original publication unknown, pertinent page of computer reprint copy is p. 1.

Computer reprint of article entitled "Versatile Device Designed for Airline Entertainment", originally published in Newsbyte News Network, dated May 4, 1992, author unknown, pertinent pages of original publication unknown, pertinent page of computer reprint copy is p. 1.

Computer reprint of article entitled "Hughes-Avicom Will Provide Personal Video Systems for Swissair First-Class Passengers", originally published in a News Release, Dateline-Glendora, Calif., dated Oct. 23, 1992, author unknown, pertinent pages of original publication unknown, pertinent page of computer reprint copy is p. 1.

Proceedings of The Scar Conference, NASA CP-001, Part 2, Langley Research Center, Nov. 9-12, 1976, excerpts entitled, "Outside Viewing" and Passenger Evacuation.

"Putting the Future of Passenger Services and Entertainment at Your Fingertips," Boeing Electronics Company, Seattle, Wash.

Sony Trans Com, "ICS Integrated Cabin System," Sep. 1992.

Hughes-Avicom International, "Only part of the big picture . . . , " dated unknown.

Matsushita Electric, "JAL Japan Airlines," date unknown.

Rosen Product Development, Inc., "'Plug-In' to the World of Flat Screen TV," date unknown.

Sony Trans Com, "PTV II TM –Personal Television," date unknown.

Matsushita Electric, "System 2000," date unknown.

Airvision, "Model 30/60. A New Vision For Inflight Entertainment," date unknown.

GEC-Marconi InFlight Systems, Inc., "The Competitive Edge . . . We Deliver," date unknown.

SEAT ARM DISPLAY MONITOR DEPLOYMENT MECHANISM

BACKGROUND OF THE INVENTION

1. Field of the Invention

The present invention relates generally to display attaching apparatus and, more particularly, is directed to a seat having an arm rest to which is attached a display monitor suitable for application to passenger seats of aircraft, railroad cars and busses to enable passengers to watch video programs on the display monitor.

2. Description of the Prior Art

Recently, low-power type display apparatus such as liquid crystal display-type television monitors and the like have been mass-produced, thus becoming less expensive. This technical progress promotes the development of display apparatus for attaching display monitors to the passenger seats of aircraft, railroad cars and busses so that individual passengers can view video programs while travelling.

The prior art display apparatus for attaching display monitors to passenger seats are roughly classified to provide the following two types: (A) a display monitor is attached to the seat back of the passenger seat just in front of the passenger who wants to watch a video program; and (B) a display monitor is mounted to the arm rest of each passenger seat.

The display apparatus of type A suffers from the disadvantage that, when the seat back is reclined, the display monitor becomes difficult to see because the distance between the passenger and the display monitor is increased by the reclining amount of the seat back. Furthermore, the distance between control switches and the display monitor is also increased and the interconnection therebetween is made complicated.

Conventional display apparatus of type B also suffer from a number of disadvantages. First, mounting the display monitor to the arm rest of the seat tends to position the monitor over the arm rest rather than in front of a viewer sitting in the seat. Second, unless the monitor can be easily moved to a stowed position, the monitor will disturb the entrance and exit of the viewer sitting in the seat, as well as the passenger sitting in the adjacent seat. Finally, conventional display apparatus that are capable of being moved to a stowed position are usually bulky and require a large amount of space inside the arm rest to conceal the entire unit. The large space requirements of these units limits the space that is available for accessory apparatus such as a tray for meals, ashtray and various kinds of control switches.

OBJECTS AND SUMMARY OF THE INVENTION

Accordingly, it is an object of the present invention to provide a display apparatus for attaching a display monitor to a seat which can eliminate the above-mentioned defects encountered with the prior art.

More specifically, it is another object of the present invention to provide a display apparatus for attaching a display monitor to a seat in which the display monitor does not become difficult to see when the seat back of the seat just in front of the passenger who wants to watch a video program is reclined.

It is still another object of the present invention to provide a display apparatus for attaching a display monitor to the arm rest of a seat in which the display monitor can be positioned over the seat and generally in front of the passenger and be maintained at this optimum viewing position so that the display monitor becomes easy to view.

It is still another object of the present invention to provide a display apparatus for attaching a display monitor to the arm rest of a seat in which the display monitor will not disturb the entrance and exit of the viewer sitting in the seat, as well as the passenger sitting in the adjacent seat.

It is still another object of the present invention to provide a display apparatus for attaching a display monitor to the arm rest of a seat in which the display monitor will not require a large amount of space inside the arm rest to conceal the entire unit.

It is still another object of the present invention to provide a display apparatus for attaching a display monitor to the arm rest of a seat in which the display monitor can be accommodated without disturbing accessory apparatus provided on the seat and the adjacent seat and the arm rest.

It is still another object of the present invention to provide a display apparatus for attaching a display monitor to the arm rest of a seat in which the viewing angle of the display monitor can be changed properly in accordance with the position of the passenger.

According to an aspect of the present invention, there is provided a display support apparatus for supporting a generally flat, video display from a passenger seat arm rest, the video display being of the type having a screen mounted on a front face, the arm rest being of the type having a recess for stowing the video display and the display support apparatus, wherein the apparatus comprises:

(a) an angled support arm having first and second ends, the support arm having a length at least as long as a diameter of the front face of the video display;

(b) first pivot means for pivotally attaching the video display to the first end of the support arm and having a first freedom of movement to permit the video display to be rotated with respect to the support arm between a viewing position and a position in which a side of the video display and the support arm are aligned and substantially parallel with each other to form a generally rectangular configuration which is stowable in the arm rest recess; and (c) second pivot means for pivotally attaching the second end of the support arm to a front portion of the arm rest to allow the support arm and display means to be rotated into and out of the arm rest recess.

These and other objects, features and advantages of the present invention will be apparent in the following detailed description of preferred embodiments when read in conjunction with the accompanying drawings, in which like reference numerals are used to identify the same or similar parts in the several views.

DETAILED DESCRIPTION OF PREFERRED EMBODIMENTS

A display apparatus for attaching a display monitor to the arm rest of a seat according to a first embodiment of the present invention will hereinafter be described with reference to FIGS. 1–7.

Figure 1:
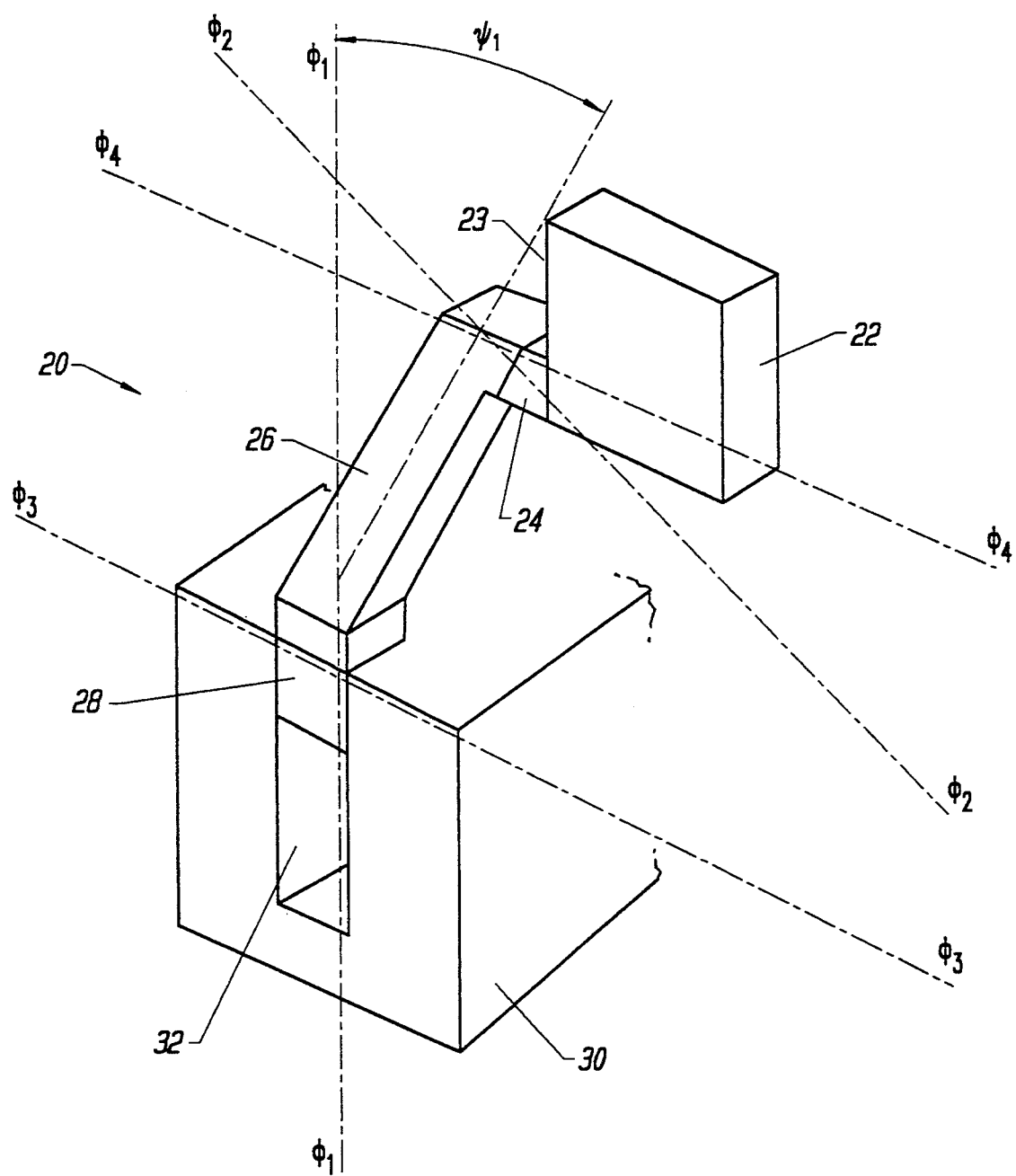
FIG. 1 through 5 are perspective views illustrating the operation of a display apparatus according to a first embodiment of the present invention.

FIG. 1 pictorially illustrates a display apparatus 20 according to the first embodiment of the present invention. The display apparatus 20 is shown in a viewing position. A display monitor 22 is attached by means of a monitor pivot block 24 to one end of a support arm 26. The support arm 26 is attached by means of an arm rest pivot block 28 to the front portion of an arm rest 30. A recess 32 for stowing the display monitor 22 and the support arm 26 is formed in the arm rest 30.

The display apparatus 20 employs four separate axes of rotation, namely, a vertical axis $\Phi_1$, a skewed axis $\Phi_2$, a horizontal axis $\Phi_3$, and another horizontal axis $\Phi_4$. One function of the first three axes, i.e., $\Phi_1$, $\Phi_2$, and $\Phi_3$, is to permit the display apparatus 20 to be folded into a relatively compact unit so that it can be stowed in the recess 32. Because the display apparatus 20 can be folded into a compact unit, the recess 32 can be smaller than the recess required by most conventional display apparatus. A small recess allows more space for various accessory apparatus contained in the arm rest.

The display apparatus 20 does not have only a single viewing position, but instead, its viewing position is capable of being adjusted. The fourth axis $\Phi_4$ and the horizontal axis $\Phi_3$ allow the display monitor 22 to be positioned for optimum viewing by a viewer sitting in the seat. Thus, as will be described in more detail below, the horizontal axis $\Phi_3$ is used both for stowing and for optimizing the viewing position of the display apparatus 20.

The display monitor 22 is of the type having a screen 25 mounted on a front face 27. The length of the support arm 26 should be at least as long as the shortest diameter of the front face 27 of the display monitor 22. Normally, this length will be slightly longer than the height of the display monitor 22. Such a length permits the display monitor 22 to be folded alongside the support arm 26 (discussed below).

The support arm 26 is angled toward the side of the arm rest 30 so that the display monitor 22 is offset from the arm rest 30. Specifically, the support arm 26 forms an acute angle $\psi_1$ with the vertical axis $\Phi_1$. An advantage of the angled support arm 26 is that when the display apparatus 20 is in viewing position, the acute angle $\psi_1$ causes the display monitor 22 to be positioned away from the arm rest 30 and over the seat so as to be more in front of a viewer sitting in the seat than conventional display apparatus. If a long support arm 26 is used, the display monitor 22 can be positioned directly in front of the viewer. However, the maximum length of the support arm 26 is defined by the maximum size of the recess 32.

Figure 2:
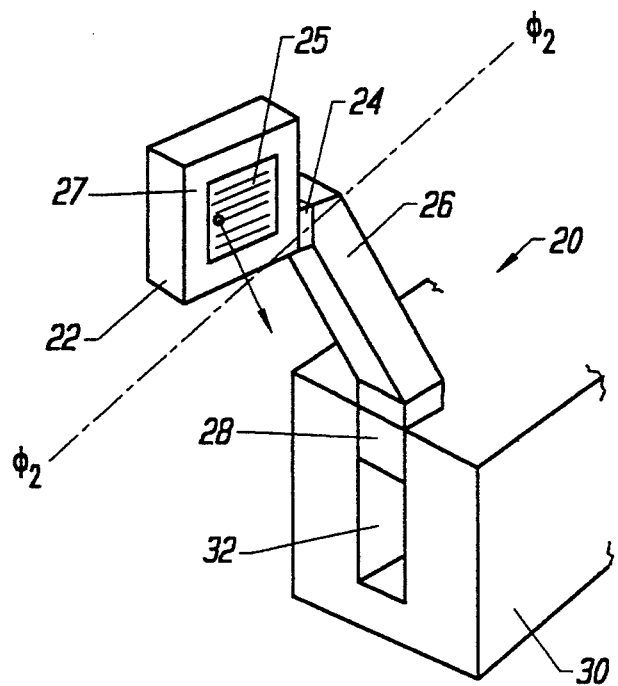

When a viewer wishes to move the display apparatus 20 into the stowed position, the viewer must first rotate the device around the vertical axis $\Phi_1$ and the skewed axis $\Phi_2$. Rotation may be performed around the axes $\Phi_1$ and $\Phi_2$ in any order. For example, the viewer may first rotate the support arm 26 around the vertical axis $\Phi_1$ until the support arm 26 is in line with the arm rest 30, as shown in FIG. 2. The vertical axis $\Phi_1$ is perpendicular to the arm rest 30 when the display apparatus 20 is in the viewing position. The movement of the angled portion of the support arm 26 around the vertical axis $\Phi_1$ defines a cone. This type of movement is referred to herein as a "conical" rotation with respect to the arm rest 30. The arm rest pivot block 28 provides the freedom of movement (discussed in detail below) that permits rotation around the vertical axis $\Phi_1$.

Figure 3:
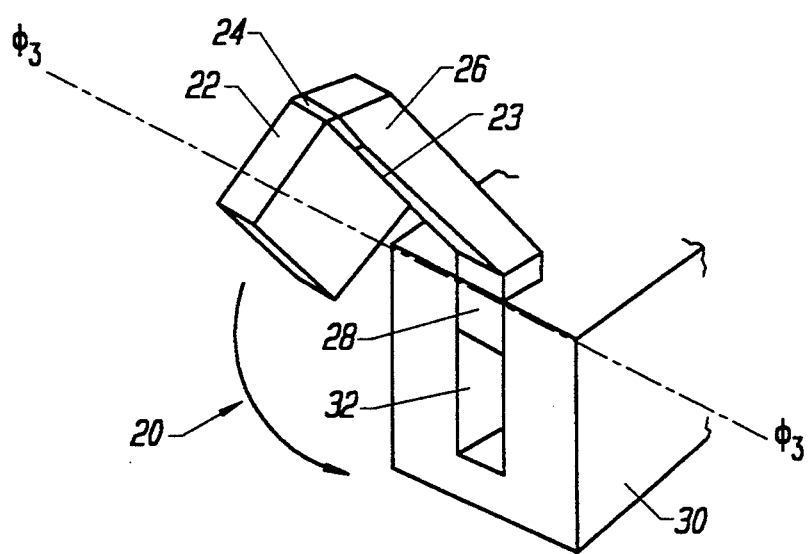

If the viewer performs rotation around the vertical axis $\Phi_1$ first, the viewer next rotates the display apparatus 20 around the skewed axis $\Phi_2$. It should be understood, however, that the display apparatus 20 may be stowed by first rotating around the skewed axis $101_2$ and then the vertical axis $\Phi_1$. Rotation around the skewed axis $\Phi_2$ causes the display monitor 22 to be rotated with respect to the support arm 26 between the viewing position and a position in which a side 23 of the display monitor 22 and the support arm 26 are aligned and substantially parallel with each other, as shown in FIG. 3. Such movement of the display monitor 22 to this position, i.e., generally alongside the support arm 26, forms a generally rectangular and compact configuration which is stowable in the recess 32. The compactness is achieved by folding the display monitor 22 back along the support arm 26 such that they are side-by-side each other. The longest dimension of the resulting configuration is the length of the support arm 26.

The monitor pivot block 24 provides the freedom of movement that permits the rotation around the skewed axis $\Phi_2$. As will be discussed in detail below, this unique rotation is facilitated by an angled shaft protruding from the monitor pivot block 24. The nature of this rotation, i.e., that it permits the display monitor 22 to be folded alongside the support arm 26, allows the display apparatus 20 to be stowed in a relatively smaller recess than conventional display apparatus.

Figure 4:
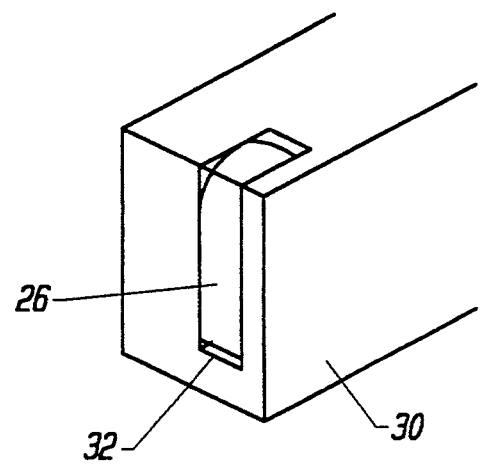

In order to complete the stowage procedure, the display apparatus 20 is rotated around the horizontal axis $\Phi_3$ which passes through the pivot block 28. The horizontal axis $\Phi_3$ is perpendicular to the arm rest 30. Rotation continues until the display monitor 22 and the support arm 26 are concealed in the recess 32, as shown in FIG. 4. The arm rest pivot block 28 provides the freedom of movement (discussed in detail below) that permits rotation around the horizontal axis $\Phi_3$.

In the preferred embodiment, the recess 32 is large enough to conceal both the display monitor 22 and the support arm 26. Furthermore, the recess 32 is located in the front portion of the arm rest 30, as illustrated in FIGS. 1 through 4.

Alternatively, it is envisioned that the recess 32 may be located behind the arm rest pivot block 28 in the upper portion of the arm rest 30. If the recess 32 is located in this alternative location, the display apparatus 20 is stowed by rotating it around the horizontal axis $\Phi_3$ in a direction opposite that shown in FIG. 3.

Figure 5:
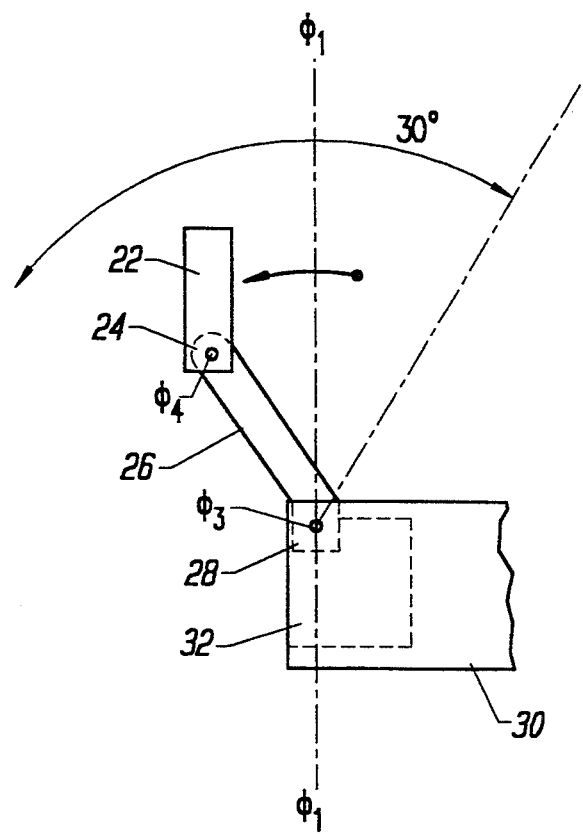

Referring to FIG. 5, the monitor pivot block 24 may provide another freedom of movement (discussed in detail below) that permits the display monitor 22 to be rotated around a horizontal axis $\Phi_4$ that is parallel to the horizontal axis $\Phi_3$. Rotation around the horizontal axis $\Phi_4$ permits the display monitor 22 to be positioned for optimum viewing by a viewer sitting in the seat. Furthermore, rotation around the horizontal axis $\Phi_3$ can also be used to position the display monitor 22 for optimum viewing. As shown in FIG. 5, such rotation permits the support arm 26 to be positioned at virtually any angle forward of the vertical axis $\Phi_2$ and up to approximately 30° behind the vertical axis $\Phi_1$. Thus, rotation around the horizontal axis $\Phi_4$, combined with rotation around the horizontal axis $\Phi_3$, may be used by a viewer to provide the most comfortable viewing position of the display apparatus 20.

Figure 6:
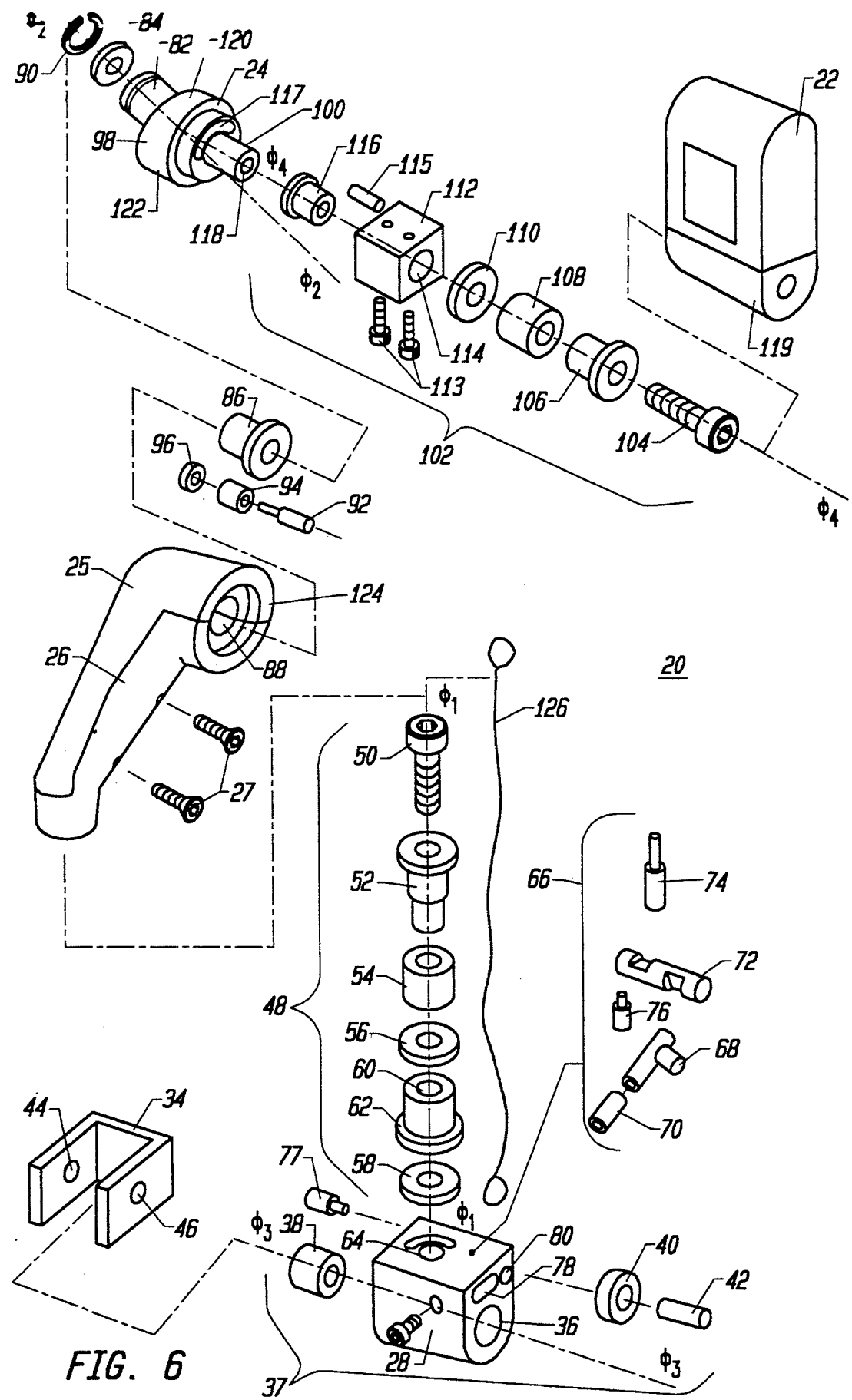
FIG. 6 is an exploded, perspective view of the component of the display apparatus according to the first embodiment of the present invention.

Referring to FIG. 6, there is illustrated the detailed assembly used to interconnect the arm rest pivot block 28, the support arm 26, the monitor pivot block 24, and the display monitor 22. Clutch assemblies 37, 48, and 102 are used to rotatably attach the pivot blocks 24 and 28 to the respective components. The clutch assemblies 37, 48, and 102 provide smooth and easy rotation around the axes $\Phi_3$, $\Phi_1$, and $\Phi_4$, respectively. Although no clutch assembly is shown for rotation around the skewed axis $\Phi_2$, it is envisioned thas such a clutch assembly may be incorporated if one is desired. The clutch assemblies 37, 48, and 102 are tight enough such that rotation will not occur until a viewer applies a force to cause such rotation. Furthermore, as will be discussed in detail below, various pins, such as travel limit pin 115 in clutch assembly 102, are used to stop the rotation of the clutch assemblies 37, 48, and 102. In one embodiment, a lock pin 72 and cam pin 68 is used to prevent rotation around certain axes until rotation around other axes has been completed.

Figure 7:
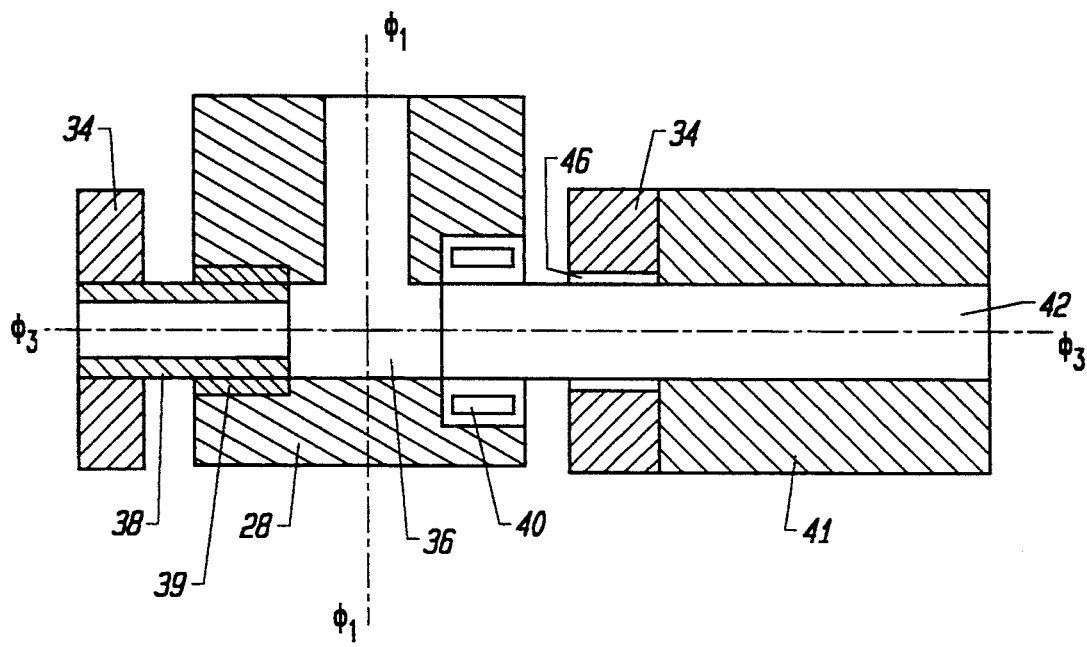
FIG. 7 is an enlarged, cross-sectional view of an arm rest pivot block assembly according to the first embodiment of the present invention.

The arm rest pivot block 28 is rotatably attached to a mounting bracket 34 by means of a clutch assembly 37. The clutch assembly 37 facilitates the freedom of movement around the horizontal axis $\Phi_3$. The mounting bracket 34 is attached near the top of the recess 32. Referring to FIG. 7, a hole 36 in the arm rest pivot block 28 receives a hub 38 in one side and a one-way clutch 40 in the other side. The hub 38 is hollow for receiving electrical cable routing therethrough. The one-way clutch 40 receives a clutch shaft 42 which passes through hole 46 in mounting bracket 34. The other end of the shaft 42 is inserted into a clutch cartridge 41.

The clutch assembly 37 shown in FIGS. 6 and 7 utilizes a one-way clutch 40. In other words, the clutch 40 engages during rotation in only one direction. Specifically, during deployment, the clutch 40 does not grip the shaft 42; this allows the pivot block 28 and the one-way clutch 40 to freely rotate around the shaft 42 (the shaft 42 is static). Because the clutch 40 is not engaged, deployment is made easy. During the stowing procedure, however, the clutch 40 does grip the shaft 42 which causes the shaft 42 to rotate. The clutch cartridge 41 provides resistance to the rotation of the shaft 42 which increases the amount of force required to rotate the support arm 26 around the horizontal axis $\Phi_3$. Thus, the support arm 26 may be easily deployed but will not return to the stowed position without the viewer's effort.

By way of example, a part number RC-061008-FS or RC-081208-FS, type DC, roller clutch, manufactured by Torrington of Torrington, Conn. may be used for the one-way clutch 40. It should be well understood, however, that a two-way clutch, i.e., one that engages in both directions, may be used in place of the one-way clutch 40. Furthermore, it is envisioned that the clutch cartridge 41 is similar to a part number XSO-1676 clutch cartridge, manufactured by Custom Products Corp. of North Haven, Conn.

Referring back to FIG. 6, the freedom of movement around the vertical axis $\Phi_1$ is facilitated by means of the clutch assembly 48. Specifically, a screw 50 fastens the support arm 26 to the arm rest pivot block 28. An adapter 52 receives the screw 50 therethrough and is inserted through a spring 54, a clutch disc 56, and a wear disc 58, and into a hole 60 in a bushing 62. While only one clutch disc 56 and one wear disc 58 are shown, additional clutch discs and wear discs may be used if necessary. The screw 50 is threaded into a hole 64 in the arm rest pivot block 28. As the support arm 26 is rotated around the vertical axis $\Phi_1$, the bushing 62 moves relative to the adapter 52. The clutch disc 56 and the wear disc 58 provide a smooth rotation.

The arm rest pivot block 28 internal components 66 control the sequence and amount of rotation that can occur along the horizontal axis $\Phi_3$ and the vertical axis $\Phi_1$. The internal components 66 include a cam pin 68, a spring 70, a lock pin 72, a travel limit pin 74, and a detent 76, and they are located inside the arm rest pivot block 28. A hole 78 in the arm rest pivot block 28 permits the cam pin 68 to protrude therefrom, and another hole 80 in the arm rest pivot block 28 permits the lock pin 72 to protrude therefrom. The precise operation of the internal components 66 will be discussed in detail below with reference being made to FIGS. 9A through 9E.

The monitor pivot block 24 attaches the display monitor 22 to the support arm 26 and provides the freedom of movement that permits the display monitor 22 to be rotated around the skewed axis $\Phi_2$. Specifically, a shaft 82 on the monitor pivot block 24 extends through one or more shims 84, a bushing 86, and into a hole 88 in the support arm 26. The shaft 82 is secured in the support arm 26 by means of a retaining ring 90. A detent pin 92, a spring 94, and a retainer 96 are installed in the support arm 26 near the hole 88. The detent pin 92 engages a slot on the backside 98 of the monitor pivot block 24 and controls the amount of rotation thereof.

The display monitor 22 is attached to a shaft 100 on the monitor pivot block 24 by means of a clutch assembly 102. The clutch assembly 102 provides the freedom of movement of the display monitor 22 around the horizontal axis $\Phi_4$. The display monitor 22 is fastened to a mounting block 112 by means of screws 113. A screw 104 passes through an adapter 106 and is anchored in a hole 118 in the shaft 100, clamping the adapter 106 to the shaft 100. The adapter 106 extends through a spring 108; the spring 108 sandwiches a clutch disc 110 against the mounting block 112. A hole 114 in the mounting block 112 receives a bushing 116 therein on the opposite side of the mounting block 112. The bushing 116 slides over the shaft 100 of the monitor pivot block 24. The screw 104 is threaded into the hole 118 in the shaft 100 and holds the clutch assembly 102 intact.

The clutch assembly 102 permits the monitor 22 to be adjusted for optimal viewing position and maintains the monitor 22 at such position. Furthermore, a travel limit pin 115 fixed to the block 112 and a corresponding rotary slot 117 in the monitor pivot block 24 limits the adjustment to about ±30°. A monitor boot cover 119 conceals the clutch assembly 102.

In the preferred embodiment, the screw 50 is a "fail screw". This screw has a notch around its perimeter which acts as a stress-raiser. At a predetermined proof load, the screw 50 will fail, preventing damage to other parts of the unit. Use of the fail screw 50 provides a predetermined failure mode that promotes passenger safety by allowing the display apparatus 20 to easily break without leaving sharp edges exposed. Such a failure mode is usually required on commercial airliners by the Federal Aviation Administration (FAA).

Figure 8:
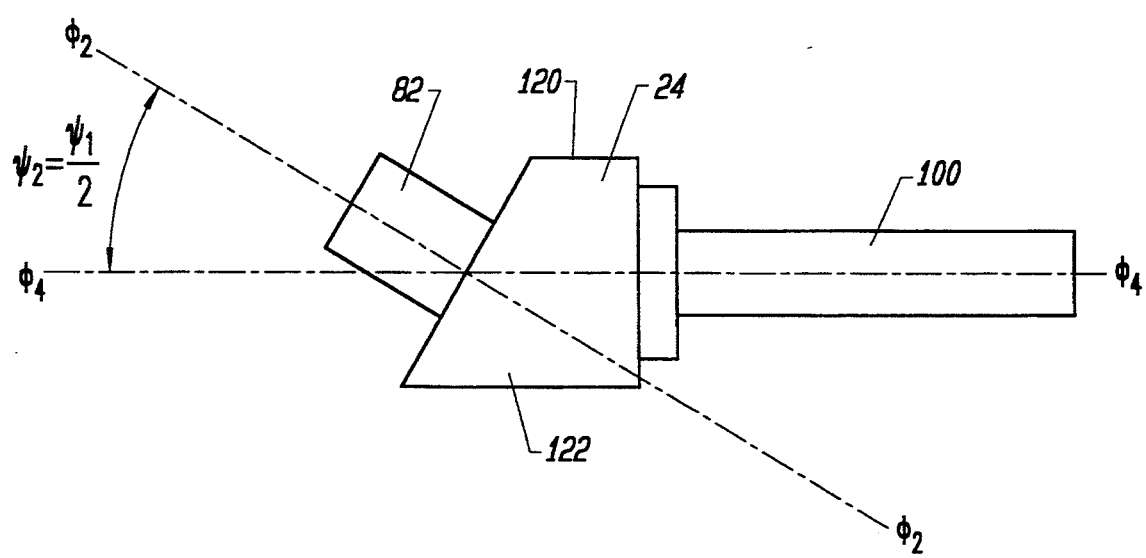
FIG. 8 is an enlarged, cross-sectional view of a monitor pivot block according to the first embodiment of the present invention.

The configuration of the shaft 82 and the shaft 100 of the monitor pivot block 24 is the feature that permits the display monitor 22 to be folded alongside and parallel to the support arm 26. Referring to FIG. 8, because the support arm 26 is positioned at an acute angle $\psi_1$ with respect to the vertical axis $\Phi_1$, the shaft 82 and the shaft 100 are not co-linear, but rather, form an acute angle $\psi_2$ at their intersection. The acute angle $\psi_2$ is the angle between the horizontal axis $\Phi_4$ and the skewed axis $\Phi_2$. This angle is necessary in order to provide horizontal rotation around the horizontal axis $\Phi_4$ and a separate rotation around the skewed axis $\Phi_2$ that will cause the display monitor to be positioned parallel to the support arm 26 for compactness. In other words, the skewed axis of rotation $\Phi_2$, which is created because the shaft 82 is not co-linear to the shaft 100, is necessary in order to position the display monitor 22 parallel to the support arm 26 because the support arm 26 is angled.

The acute angle $\psi_2$ is normally equal to one-half of the acute angle $\psi_1$, i.e., $\psi_2=\psi_1/2$. Thus, in the preferred embodiment, $\Phi_1$ is equal to 30° and $\psi_2$ is equal to 15°. Because of the acute angle $\psi_2$ between the shafts 82 and 100, the upper portion 120 of the monitor pivot block is narrower than the lower portion 122 of the monitor pivot block. Referring back to FIG. 6, the hole 88 in the support arm 26 is angled such that when the shaft 82 is received therein the shaft 100 is approximately horizontal. Furthermore, the surface 124 on the support arm 26 that contacts the backside 98 of the monitor pivot block 24 is also angled such that the shaft 100 is approximately horizontal when the display monitor 22 is in the viewing position.

As the monitor pivot block 24 rotates around the shaft 82 (i.e., the skewed axis $\Phi_2$) relative to the support arm 26, the shaft 100 will not remain horizontal, but rather, will be directed downward to become perpendicular or nearly perpendicular to the body of the support arm 26. This redirection of the shaft 100 causes the display monitor 22 to be moved in close proximity to, and alongside, the support arm 26.

The detent pin 92 engages a recess in the rear face of the monitor pivot block 24 which holds the monitor 22 in the down position. When the monitor 22 is rotated to the viewing position, the detent pin 92 is depressed, disengaging the pin 92 from the recess. As the display monitor 22 approaches the upright position, the detent pin 92 engages a second recess in the rear face of the monitor pivot block 24, holding the monitor 22 in the upright position.

A lanyard 126 runs through the hub 38, the arm rest pivot block 28, the clutch assembly 48, and into the support arm 26. A cover 25 covers the backside of the support arm 26 and is secured in place by means of two screws 27. One end of the lanyard 126 is secured to the interior of the support arm 26 and the other end is secured to the arm rest 30. The lanyard 126 prevents the upper portion of the unit from separating from the arm rest 30 if the screw 50 fails.

Alternatively, the lanyard's 126 function can be provided by a wiring harness that provides power and data to the display monitor 22. Wiring to the display monitor 22 is routed through the pivot block hub 38, clutch assembly 48, screw 50, support arm 26, the monitor pivot block 24, the clutch assembly 102, and the screw 104. Connection to the display monitor 22 is made via a connector located within the monitor cover boot 119.

Figure 9A:
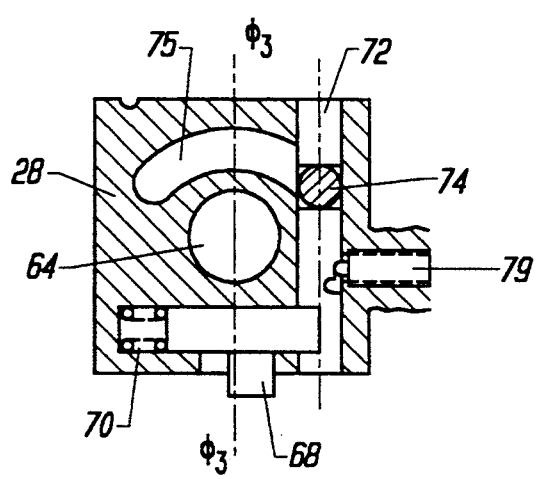
FIG. 9A–9E are enlarged, cross-sectional views illustrating the operation of a component of the display apparatus according to the first embodiment of the present invention.

Referring to FIGS. 9A through 9E, the operation of the arm rest pivot block 28 internal components 66 will be described in detail. FIG. 9A is a cross-sectional view of the arm rest pivot block 28 in the stowed position. The spring 70 holds the cam pin 68 in a notch in the lock pin 72. The cam pin 68 locks the lock pin 72 and the travel limit pin 74 in position. Locking the lock pin 72 prevents it from contacting the mounting bracket 34 during deployment and stowage. Furthermore, because the travel limit pin 74 is fixed to the under-side of the bushing 62, locking the travel limit pin 74 prevents the support arm 26 from rotating during deployment and stowage. The travel limit pin 74 also prevents the unit from being rotated into the adjoining passenger seat space.

Figure 9B:
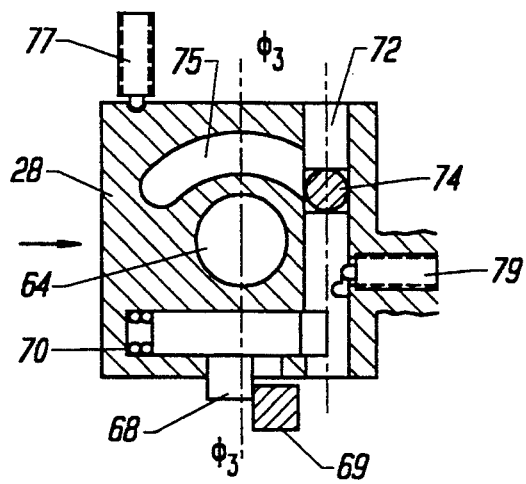

In order to deploy the display apparatus 20, the seat occupant manually rotates the support arm 26 around the horizontal axis $\Phi_3$ to the upright position, as shown in FIG. 9B. The cam pin 68 contacts a cam 69 on the mounting bracket 34. The cam pin 68 is depressed against the spring 70 and disengages from the lock pin 72. A detent pin 77 engages the pivot block 28 and holds the pivot block 28 in the upright position against the force of the spring 70.

Figure 9C:
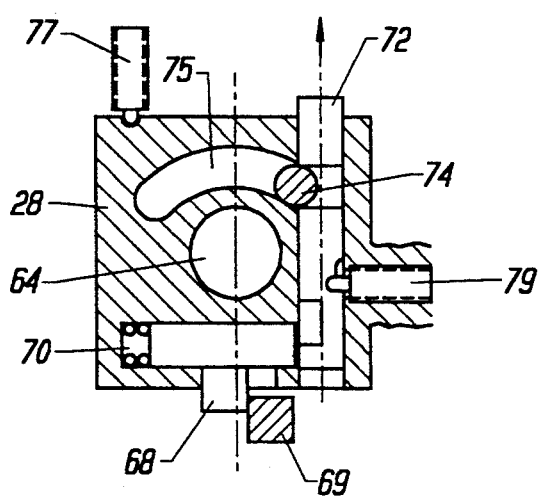

Because the cam pin 68 is disengaged from the lock pin 72, the lock pin 72 can slide easily along its track. When the seat occupant rotates the support arm 26 around the vertical axis $\Phi_1$ into the viewing position, the travel limit pin 74 pushes the lock pin 72 axially and extends the end of the lock pin 72 out past the edge of the pivot block 28, engaging a slot in the mounting bracket 34. The travel limit pin 74 is then free to move along the rotary slot 75 in the pivot block 28 top face, as shown in FIG. 9C, which permits the support arm 26 to rotate. A bottom detent 79 extends into the lock pin 72 slightly and holds the lock pin 72 in the extended position. The bottom detent 79 prevents the lock pin 72 from being rotated.

Figure 9D:
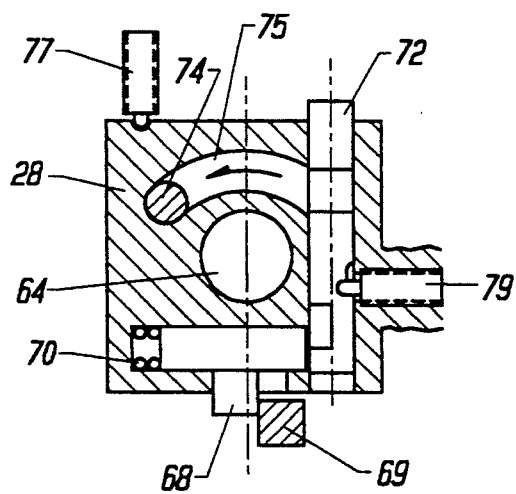

FIG. 9D illustrates the position of the arm rest pivot block internal components 66 when the support arm 26 is fully rotated and in viewing position. Note that the travel limit pin 74 is located at the end of the rotary slot 75.

Figure 9E:
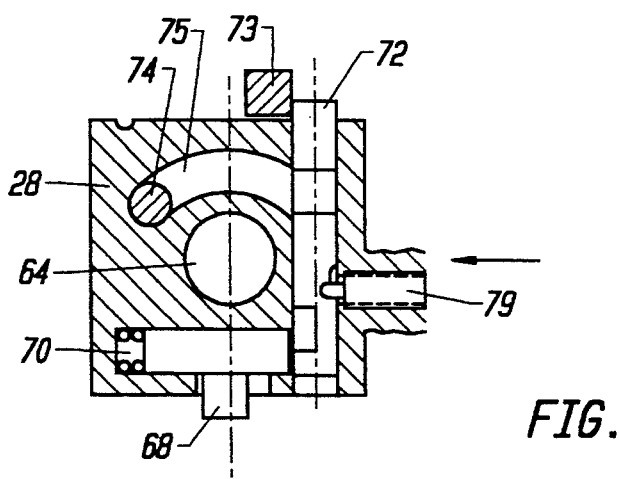

When the seat occupant wishes to position the display monitor 22 in the optimal viewing position, the support arm 26 is reclined forward, as illustrated in FIG. 9E and FIG. 5. The cam pin 68 disengages the cam 69 on the mounting bracket 34. The spring 70 pushes the cam pin 68 forward until contact is made with the lock pin 72. The lock pin 72 contacts the end of the slot 73 in the mounting bracket 34 and defines the extent of the support arm's 26 recline. Thus, the lock pin 72 prevents the unit from being rotated down towards the stowage position when the support arm 26 is in the viewing position. The detent pin 77 disengages the pivot block 28.

During seat egress/ingress, the seat occupant manually rotates the support arm 26 to a position suitable for such egress/ingress. The clutch assemblies 37 and 48 maintain the support arm's 26 position and prevent the unit's mass from causing it to pivot down.

When the seat occupant wishes to stow the unit, the occupant manually rotates the support arm 26 to a position in line with seat arm 30. The travel limit pin 74 travels back through the rotary slot 75 in the pivot block 28 top face and engages lock pin 72, as shown in FIG. 9C. The travel limit pin 74 pushes the lock pin 72 back into the confines of the pivot block 28 which disengages the lock pin 72 from the slot 73 in the mounting bracket 34, as shown in FIG. 9B. The bottom detent 79 is compressed but maintains contact with lock pin 72 to resist lock pin rotation.

After the seat occupant rotates the display monitor 22 down alongside the support arm 26, the support arm 26 is rotated down into the stowed position in the recess 32. The cam pin 68 breaks contact with the cam 69 on the mounting bracket 34 and engages the lock pin 72, as shown in FIG. 9A. The travel limit pin 74 is locked in place by the lock pin 72 which prevents the support arm 26 from rotating during the stowage cycle. Furthermore, the clutch roller 40 engages the clutch assembly 37 which prevents the unit from rotating uncontrollably due to its own mass. However, the clutch assembly 37 requires the seat occupant to apply a small force in order to perform the stowage operation.

Figure 10:
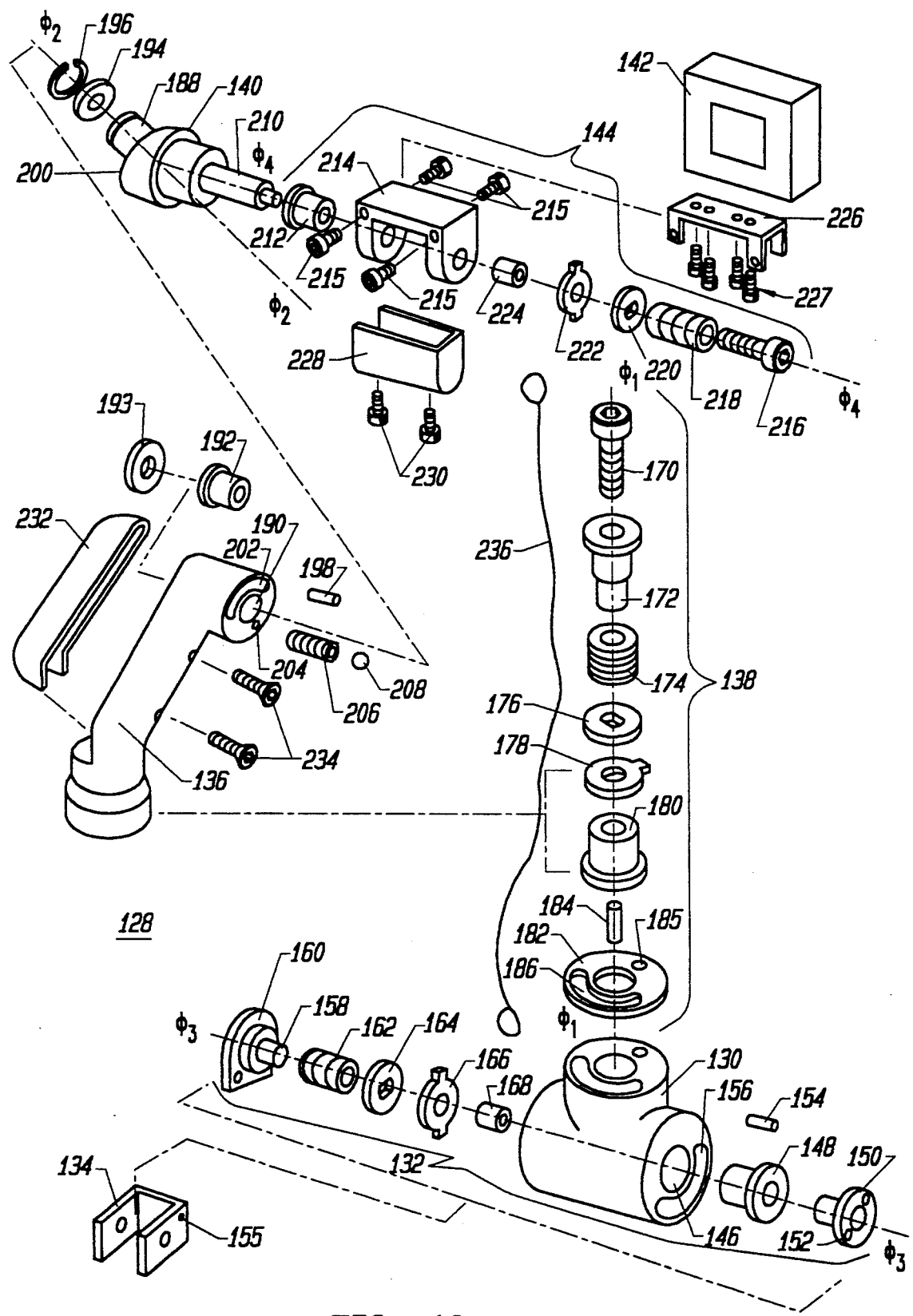
FIG. 10 is an exploded, perspective view of the components of the display apparatus according to a second embodiment of the present invention.

Referring to FIG. 10, there is illustrated a second embodiment of a display apparatus 128 in accordance with the present invention. The display apparatus 128 includes the same basic components as the display apparatus 20. Namely, an arm rest pivot block 130 is attached by means of a clutch assembly 132 to a mounting bracket 134. The mounting bracket 134 is secured to the upper portion of a recess located in the front portion of an arm rest. A support arm 136 is attached to the arm rest pivot block 130 by means of a clutch assembly 138. A monitor pivot block 140 is attached to the upper portion of the support arm 136. A display monitor 142 is attached to the monitor pivot block 140 by means of a clutch assembly 144.

Although the clutch assemblies 132, 138, and 144 are slightly different than the respective clutch assemblies 37, 48, and 102 of the display apparatus 20, they serve the same basic purpose. The clutch assembly 132 shown in FIG. 10 is two-way clutch, i.e., it is a constantly engaging clutch that resists rotation in both directions. It should be understood, however, that a one-way clutch assembly may be used instead.

Specifically, a hole 146 in the arm rest pivot block 130 receives a bushing 148 therein. A hub 150 engages with the mounting bracket 134 and the bushing 148. A hole 155 in the bracket 134 receives a travel limit pin 154 for engaging a rotary slot 156 in the arm rest pivot block 130. A shaft 158 on an adapter 160 protrudes through a spring 162, static clutch plate 164 and dynamic clutch plate 166. While only one clutch plate 164 and one clutch plate 166 are shown, additional clutch plates may be used if necessary. A bushing 168 is located in the hole 146 of the pivot block 130. The shaft 158 extends into the bushing 168 on the opposite side of the arm rest pivot block 130.

With respect to the clutch assembly 138, a screw 170, adapter 172, spring 174, static clutch plate 176, dynamic clutch plate 178, and a bushing 180 are assembled in the same manner as the clutch assembly 48 of the display apparatus 20. Additional clutch plates 176 and 178 may be used if necessary. A wear disc 182 is positioned between the bushing 180 and the arm rest pivot block 130. A travel limit pin 184 engages a rotary slot 186 in the wear disc 182 and pivot block 130 to limit the range of rotation of the support arm 136. The screw 170 may be a fail screw like the screw 50 shown in FIG. 6.

The primary difference between the arm rest pivot block 130 and the arm rest pivot block 28 of the display apparatus 20 is that the arm rest pivot block 130 has no internal lock pin or cam pin. Without the internal lock pin or cam pin, either of the clutch assemblies 132 or 138 may be rotated irrespective of the position of the complimentary clutch assembly. This added flexibility has both advantages and disadvantages. It should be understood, however, that an internal lock pin and cam pin may be incorporated into the arm rest pivot block 130.

One advantage of this added flexibility is that a viewer may rotate the support arm 136 around the vertical axis $\Phi_1$ while simultaneously rotating the support arm 136 around the horizontal axis $\Phi_3$. Because of the internal cam pin and lock pin, this simultaneous rotation is not possible with the support arm 26 of the display apparatus 20. This simultaneous rotation capability allows a viewer to stow the display apparatus 128 more quickly than the display apparatus 20 because viewers may not realize that the support arm 26 of the display apparatus 20 must be rotated to a certain position in order to be stowed. Another advantage is that the display arm 136 may be rotated around the horizontal axis $\Phi_3$ in the directions shown in FIG. 5 for improved adjustment of viewing position.

One disadvantage of the added flexibility of the display apparatus 128, however, is that a viewer may attempt to rotate the support arm 136 around the horizontal axis $\Phi_3$ and into the arm rest recess before the support arm 136 has been rotated around the vertical axis $\Phi_1$ and aligned with the arm rest. In this scenario, the display monitor 142 will not be aligned with the recess opening and will be thrust against the arm rest which may damage the display monitor 142. The cam pin and lock pin of the display apparatus 20 prevent rotation around the horizontal axis $\Phi_3$ before the support arm 26 has been rotated around the vertical axis $\Phi_1$ and aligned with the arm rest recess 32.

A shaft 188 on the monitor pivot block 140 extends through a hole 190 in the support arm 136. A bushing 192 is inserted in the opposite side of the hole 190. A wavy washer 193 is placed on the bushing 192. The shaft 188 is secured by means of a retaining ring 196. The wavy washer 193 is sandwiched between the bushing 192 and one or more shims 194. A travel limit pin 198 is fixed to the backside 200 of the monitor pivot block 140 for engagement with a slot 202 in the support arm 136. A hole 204 receives the spring 206 and a ball 208 for engagement with the backside 200 of the monitor pivot block 140. The travel limit pin 198 limits the amount that the monitor pivot block 140 can be rotated, and the ball 208 engages depressions on the backside 200 of the monitor pivot block 140 in order to maintain the display monitor 142 in the monitor up or monitor down positions.

With respect to the clutch assembly 144, another shaft 210 on the monitor pivot block 140 extends through a bushing 212, a monitor bracket 214, and is anchored in a bushing 224 which is pressed into the monitor bracket 214. A screw 216 extends through a spring 218, a static clutch plate 220, a dynamic clutch plate 222, and into the end of the shaft 210. Additional clutch plates 220 and 222 may be used if necessary.

The monitor 142 is attached to the monitor bracket 214 by means of an adaptor plate 226, screws 227, and screws 215. A cover 228 is fastened to the opposite side of the monitor bracket 214 by means of two screws 230.

A cover 232 is secured to the support arm 136 by means of two screws 234. The cover 232 allows access to the backsides of the clutch assembly 138 and the monitor pivot block 140. A lanyard 236 may be run through the hub 150, the pivot block 130, the clutch assembly 138, and into the support arm 136, or, as discussed above, a wiring harness may provide the same function as the lanyard 236.

Figure 11:
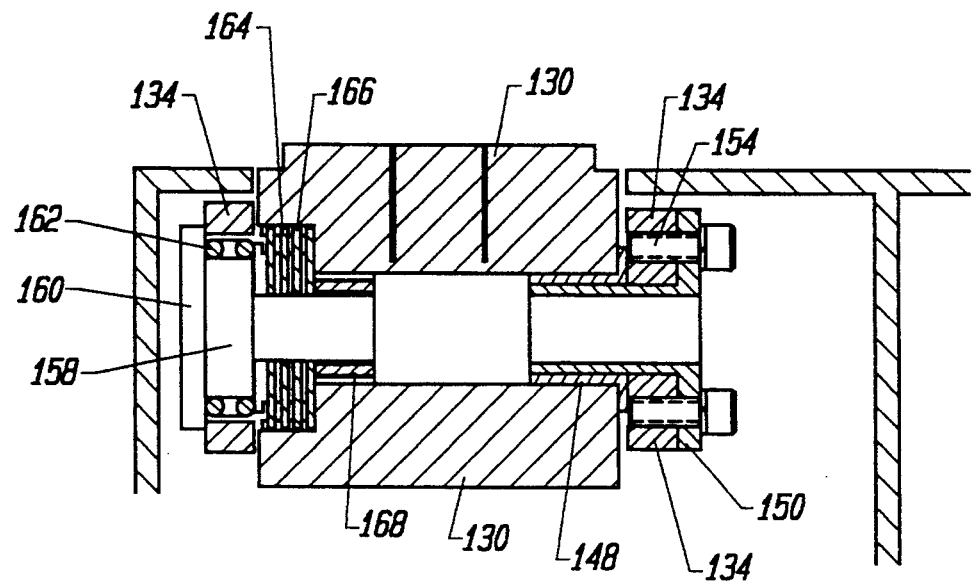
FIG. 11 is an enlarged, cross-sectional view of an arm rest pivot block assembly according to the second embodiment of the present invention.

Referring to FIG. 11, there is illustrated a detailed cross-sectional view of the arm rest pivot block 130. One side of the mounting bracket 134 is sandwiched between the hub 150 and the bushing 148. The other side of the mounting bracket 134 receives the adaptor 160. The spring 162 surrounds the adaptor 160 within the hole in the mounting bracket 134. The clutch plates 164 and 166 surround the shaft 158 of the adaptor 160 and are countersunk into the arm rest pivot block 130. The bushing 168 locates the shaft 158.

Figure 12:
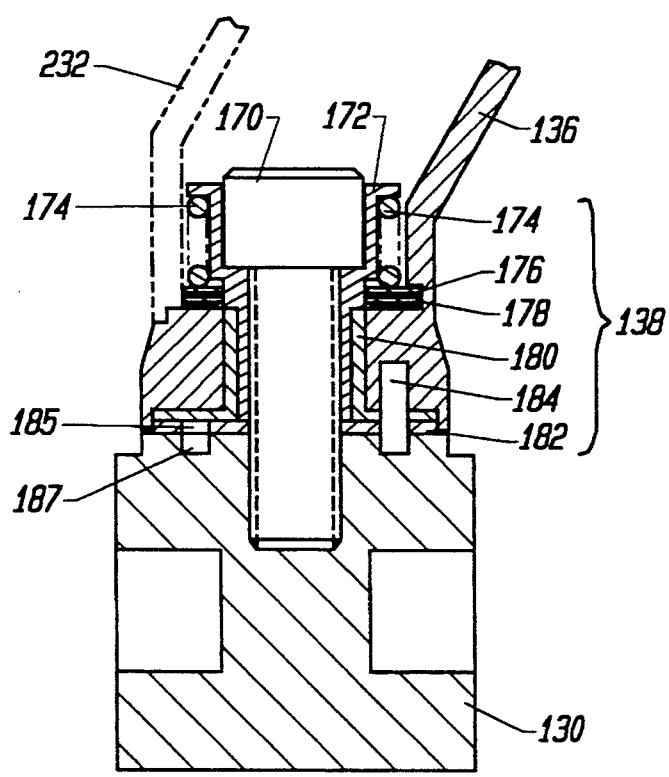
FIG. 12 is an enlarged, cross-sectional view of a clutch assembly according to the second embodiment of the present invention.

Referring to FIG. 12, there is illustrated a detailed cross-sectional view of the clutch assembly 138. The adaptor 172 is received by the bushing 180. The screw 170 is received by the adaptor 172 and secures the support arm 136 to the arm rest pivot block 130. The disk 182 is sandwiched between the bushing 180 and the arm rest pivot block 130. The travel limit pin 184 is mounted in the support arm 136 and the bushing 180. The rotary slot 186 and the disk 182 receives the other end of the travel limit pin 184. A dowel 187 mounted in the arm rest pivot block 130 is received in a hole 185 in the disk 182 to prevent rotation thereof. The clutch plates 176 and 178 surround the adaptor 172 and are held in position by the spring 174.

Figure 13:
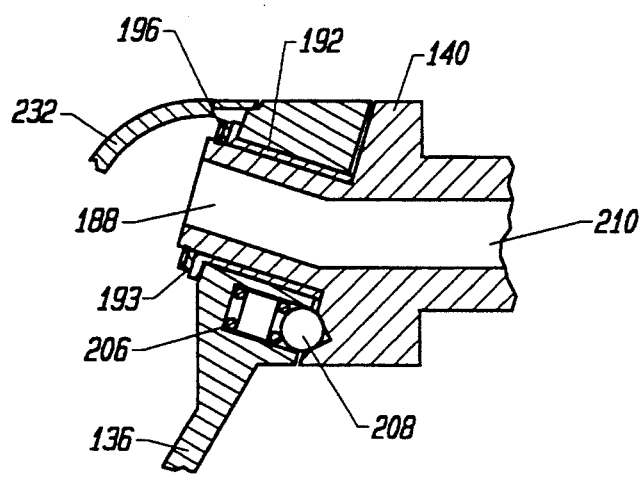
FIG. 13 is a cross-sectional view of a monitor pivot block assembly according to the second embodiment of the present invention.

FIG. 13 is a detailed cross-sectional view illustrating the manner in which the monitor pivot block 140 is attached to the support arm 136. The bushing 192 receives the shaft 188 which is secured in position by the wavy washer 193 and the retaining ring 196. The spring 206 applies pressure to the ball 208 forcing it into a depression formed in the backside of the monitor pivot block 140. There is a depression for when the display monitor 142 is in viewing position and another depression for when the display monitor is in the stowed position. These depressions prevent the display monitor from rotating when it is in one of these positions.

Figure 14:
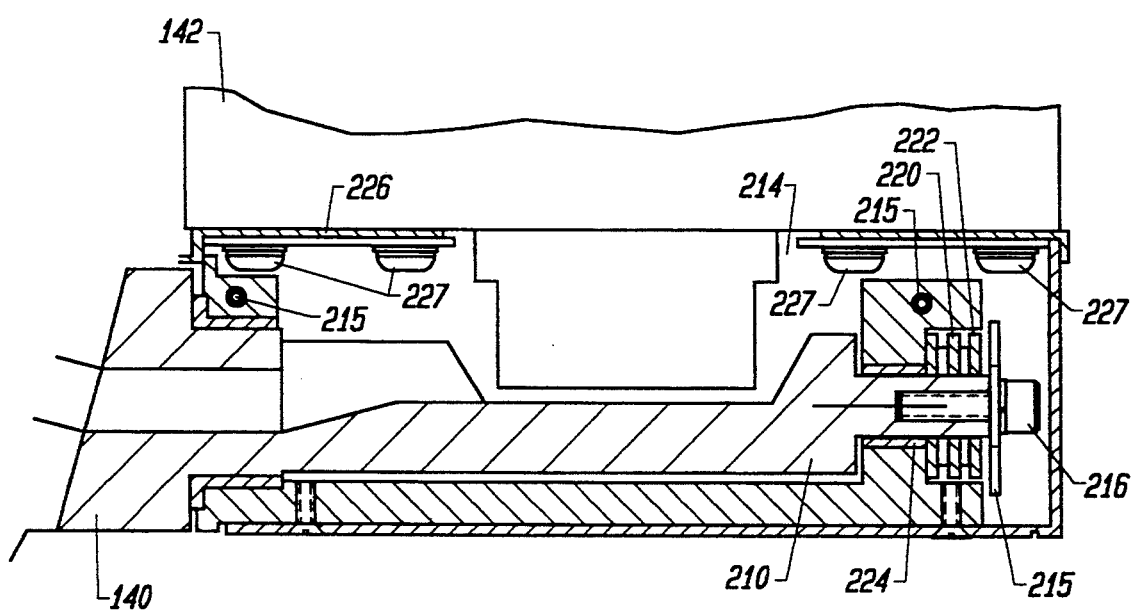
FIG. 14 is an enlarged, cross-sectional view of a clutch assembly according to the second embodiment of the present invention.

FIG. 14 is a detailed cross-sectional view of the clutch assembly 144. The screw 216 extends through a washer 215 and is anchored in the end of the shaft 210. The bushing 224 and the clutch plates 220 and 222 surround the end of the shaft 210 and are sandwiched between the washer 215 and the bracket 214. Display monitor 142 is attached by means of the adapter plate 226 to the bracket 214.

Although the display apparatus 20 and 128 have been described herein as being rotated and deployed manually by a viewer sitting in the seat, it is envisioned that such rotation and clutch assembly activation may be performed automatically by means of electric motors or the like.

Having described preferred embodiments of the invention in detail with reference to the accompanying drawings, it is to be understood that the present invention is not limited to those precise embodiments and that many changes and modifications could be effected by one with ordinary skill in the art without departing from the spirit and scope of the invention as defined in the appended claims.

What is claimed is:

1. A display support apparatus for supporting a generally flat, video display from a passenger seat arm rest, the video display being of the type having a screen mounted on a front face, the arm rest being of the type having a recess for stowing the video display and the display support apparatus, comprising:

an angled support arm having first and second ends, the support arm having a length at least as long as a diameter of the front face of the video display;

first pivot means for pivotally attaching the video display to the first end of the support arm and having a first freedom of movement to permit the video display to be rotated around a first axis with respect to the support arm between a viewing position and a position in which a side of the video display and the support arm are alongside and substantially parallel with each other to form a generally rectangular configuration which is stowable in the arm rest recess, the first pivot means including a first pivot block having a first pivot joint which provides the first freedom of movement and a second pivot joint which provides a second freedom of movement permitting the video display to be rotated around a second axis that is horizontal so that the video display can be positioned for optimum viewing by a viewer sitting in the seat, the first axis and the second axis forming a first acute angle $\Psi_2$; and second pivot means for pivotally attaching the second end of the support arm to a front portion of the arm rest to allow the support arm and display means to be rotated into and out of the arm rest recess.

2. A display apparatus according to claim 1, wherein the second pivot means comprises a second pivot block having a third pivot joint which provides a third freedom of movement permitting the support arm and the video display to be rotated around a third axis that is horizontal and perpendicular to the arm rest and a fourth pivot joint which provides a fourth freedom of movement permitting the support arm to be rotated around a fourth axis that is perpendicular to the third axis, the support arm forming a second acute angle $\Psi_1$ with the fourth axis.

3. A display apparatus according to claim 2, wherein the third pivot joint comprises a first shaft extending horizontally through a hole in the second pivot block, the ends of the first shaft being anchored to the arm rest within the recess, and the fourth pivot joint comprises a fail screw having a notch around its perimeter which functions as a stress-raiser to secure the support arm to the second pivot block, the fail screw being anchored in the second pivot block perpendicular to the first shaft.

4. A display support apparatus for supporting a generally flat, video display from a passenger seat arm rest, the video display being of the type having a screen mounted on a front face, the arm rest being of the type having a recess for stowing the video display and the display support apparatus, comprising:

an angled support arm having first and second ends, the support arm having a length at least as long as a diameter of the front face of the video display;

first pivot means for pivotally attaching the video display to the first end of the support arm and having a first freedom of movement to permit the video display to be rotated around a first axis with respect to the support arm between a viewing position and a position in which a side of the video display and the support arm are alongside and substantially parallel with each other to form a generally rectangular configuration which is stowable in the arm rest recess, the first pivot means including a first pivot block having a first pivot joint which provides the first freedom of movement and a second pivot joint which provides a second freedom of movement permitting the video display to be rotated around a second axis that is horizontal so that the video display can be positioned for optimum viewing by a viewer sitting in the seat; and second pivot means for pivotally attaching the second end of the support arm to a front portion of the arm rest to allow the support arm and display means to be rotated into and out of the arm rest recess;

wherein the second pivot means comprises a second pivot block having a third pivot joint which provides a third freedom of movement permitting the support arm and the video display to be rotated around a third axis that is horizontal and perpendicular to the arm rest and a fourth pivot joint which provides a fourth freedom of movement permitting the support arm to be rotated around a fourth axis that is perpendicular to the third axis, the support arm forming a first acute angle $\Psi_1$ with the fourth axis.

5. A display support apparatus for supporting a generally flat, video display from a passenger seat arm rest, the video display being of the type having a screen mounted on a front face, the arm rest being of the type having a recess for stowing the video display and the display support apparatus, comprising:

an angled support arm having first and second ends, the support arm having a length at least as long as a diameter of the front face of the video display;

first pivot means for pivotally attaching the video display to the first end of the support arm and having a first freedom of movement to permit the video display to be rotated around a first axis with respect to the support arm between a viewing position and a position in which a side of the video display and the support arm are aligned and substantially parallel with each other to form a generally rectangular configuration which is stowable in the arm rest recess, the first pivot means including a first pivot block having a first pivot joint which provides the first freedom of movement and a second pivot joint which provides a second freedom of movement permitting the video display to be rotated around a second axis that is horizontal so that the video display can be positioned for optimum viewing by a viewer sitting in the seat, the first pivot joint including a first shaft protruding into a hole in the support arm and the second pivot joint including a second shaft protruding into a hole in the video display, the first shaft and the second shaft forming a first acute angle $\Psi_2$; and second pivot means for pivotally attaching the second end of the support arm to a front portion of the arm rest to allow the support arm and display means to be rotated into and out of the arm rest recess;

wherein the second pivot means includes a second pivot block having a third pivot joint which provides a third freedom of movement permitting the support arm and the video display to be rotated around a third axis that is horizontal and perpendicular to the arm rest and a fourth pivot joint which provides a fourth freedom of movement permitting the support arm to be rotated around a fourth axis that is perpendicular to the third axis, the support arm forming a second acute angle $\Psi_1$ with the fourth axis, the first acute angle $\Psi_2$ being approximately equal to one-half the second acute angle $\Psi_1$.

6. A display apparatus according to claim 5, wherein a retaining ring retains the first shaft in the hole in the support arm and a screw secures the video display onto the second shaft.

7. A display apparatus for attachment to a passenger seat, comprising:

a video display having a screen mounted on a front face;

an arm rest attachable to a passenger seat and formed with a recess for stowing the video display;

a support arm having first and second ends, the support arm having a length at least as long as a diameter of the front face of the video display;

first pivot means for attaching the video display to the first end of the support arm, the first pivot means having a first freedom of movement so that the video display can be rotated around a first axis with respect to the support arm to a position in which a side of the video display and the support arm are alongside and substantially parallel with each other to form a generally rectangular configuration which is stowable in the arm rest recess, the first pivot means including a first pivot block having a first shaft protruding therefrom and extending into a hole in the support arm for providing the first freedom of movement, the first pivot block having a second shaft protruding therefrom for providing a second freedom of movement that permits the video display to be rotated around a second axis that is horizontal so that the video display can be positioned for optimum viewing by a viewer sitting in the seat, the first shaft and the second shaft forming a first acute angle $\Psi_2$; and second pivot means for attaching the second end of the support arm to a front portion of the arm rest, wherein the second pivot means permits the support arm and the video display to be rotated from a position inside the recess to a position outside the recess so as to be viewable by a viewer sitting in the seat.

8. A display apparatus according to claim 7, wherein the second pivot means comprises a second pivot block having a first pivot joint which provides a third freedom of movement permitting the support arm and the video display to be rotated around a third axis that is horizontal and perpendicular to the arm rest.

9. A display apparatus according to claim 8, wherein the first pivot joint comprises a third shaft extending horizontally through a hole in the second pivot block, the ends of the third shaft being anchored to the arm rest within the recess.

10. A display apparatus according to claim 8, wherein the second pivot block has a second pivot joint which provides a fourth freedom of movement permitting the support arm to be rotated around a fourth axis that is perpendicular to the third axis, the support arm forming a second acute angle $\Psi_1$ with the fourth axis.

11. A display apparatus according to claim 10, wherein the second pivot joint comprises a fail screw having a notch around its perimeter which functions as a stress-raiser to secure the support arm to the second pivot block, the fail screw being anchored in the second pivot block perpendicular to the third axis.

12. A display apparatus for attachment to a passenger seat, comprising:
   a video display having a screen mounted on a front face;
   an arm rest attachable to a passenger seat and formed with a recess for stowing the video display;
   a support arm having first and second ends, the support arm having a length at least as long as a diameter of the front face of the video display;
   first pivot means for attaching the video display to the first end of the support arm, the first pivot means having a first freedom of movement so that the video display can be rotated around a first axis with respect to the support arm to a position in which a side of the video display and the support arm are aligned and substantially parallel with each other to form a generally rectangular configuration which is stowable in the arm rest recess, the first pivot means including a first pivot block having a first shaft protruding therefrom for providing the first freedom of movement, the first shaft extending into a hole in the support arm and being anchored therein with a retaining ring, the first pivot block having a second shaft protruding therefrom for providing a second freedom of movement that permits the video display to be rotated around a second axis that is horizontal so that the video display can be positioned for optimum viewing by a viewer sitting in the seat, the first shaft and the second shaft forming a first acute angle $\Psi_2$, the video display being secured to the second shaft with a screw; and
   second pivot means for attaching the second end of the support arm to a front portion of the arm rest, wherein the second pivot means permits the support arm and the video display to be rotated from a position inside the recess to a position outside the recess so as to be viewable by a viewer sitting in the seat;
   wherein the second pivot means includes a second pivot block having a first pivot joint which provides a third freedom of movement permitting the support arm and the video display to be rotated around a third axis that is horizontal and perpendicular to the arm rest;
   wherein the second pivot block has a second pivot joint which provides a fourth freedom of movement permitting the support arm to be rotated around a fourth axis that is perpendicular to the third axis, the support arm forming a second acute angle $\Psi_1$ with the fourth axis, the first acute angle $\Psi_2$ being approximately equal to one-half the second acute angle $\Psi_1$.

* * * * *